JAMES H. HANSEN,
NELSON J. LEEDY &
ROBERT O. SLONAKER
INVENTORS

ATTORNEYS

JAMES H. HANSEN,
NELSON J. LEEDY &
ROBERT O. SLONAKER
INVENTORS

United States Patent Office 3,685,978
Patented Aug. 22, 1972

3,685,978
LAMINAR REFRACTORY STRUCTURES FOR FORMING GLASS FIBERS
James H. Hansen, Newark, Nelson J. Leedy, Heath, and Robert O. Slonaker, Reynoldsburg, Ohio, assignors to Owens-Corning Fiberglas Corporation
Continuation-in-part of application Ser. No. 880,625, Nov. 28, 1969. This application Dec. 31, 1969, Ser. No. 889,461
Int. Cl. C03b 37/02
U.S. Cl. 65—1
5 Claims

ABSTRACT OF THE DISCLOSURE

Glass fiber forming apparatus adapted to receive and emit molten glass, which apparatus has a high density coating of a refractory material of sufficient thickness to retain oxides of the platinum group metals which form and migrate from the apparatus during service at high operating temperatures.

This is a continuation-in-part of application Ser. No. 880,625, filed Nov. 28, 1969.

BACKGROUND OF THE INVENTION

This invention relates to protective coatings for alloys used at high service temperatures. More specifically, the invention relates to high density, high temperature coatings, in combination with precious metal alloys, comprising magnesia, zirconia, alumina, titania, chromia, and combinations thereof which are particularly suited for preventing losses of precious metals from the alloys when fabricated into apparatus which is used in the production of glass fibers. Other suitable refractory oxides, stable to 3300° F. may be used. The coatings are substantially non-porous or fused when combined with the fabricated apparatus.

Service conditions encountered in glass fiber-forming operations are varied and generally severe. A combination of exposure to corrosive molten glass and exposure to high temperatures (1800–3300° F.) in an oxidizing atmosphere precludes the use of almost all alloy systems.

Alloys comprising precious metals (platinum, iridium, rhodium, et al.) possess suitable characteristics for high temperature-high strength applications. However, even these alloys have measurable oxidation rates, thereby leading to losses in efficiency and economics. The oxides of precious metals volatilize upon formation causing considerable amounts of precious metal to be lost continuously in the glass fiber forming operation. Although there are reclamation processes to recover some of the oxidized precious metals, the processes require time thereby temporarily delaying the availability of the precious metal. Furthermore, there are non-recoverable losses which present economic as well as inventory problems for the fabricators of these articles.

When various alloy compositions are fabricated into glass handling apparatus and that apparatus is subsequently exposed to high temperatures during service, there have been in the past some problems experienced therewith.

Some of these problems include limitations on the operating temperatures at which the fabricated apparatus can be subjected, i.e., the oxidation losses are so rapid that they lead to the early degradation of the apparatus and furthermore account for an inefficient, non-uniform operation of the apparatus.

Another problem that fabricators and users of apparatus for handling molten glass have faced for many years is that of strength during service operations at high temperature. The apparatus tends to creep (sag, buckle, etc.) during operation thereby adversely affecting the performance of the apparatus by changing the alignment of various interrelated parts of the operation. Specific reference is made to a bushing or feeder, used in the production of glass fibers. A bushing typically comprises a receptacle, capable of receiving and emitting molten glass, wherein its lower wall or bottom surface has a plurality of uniformly spaced openings or hollow members extending downwardly therefrom through which molten streams of glass emit for attenuation into glass fibers. Shielding members independently supported and aligned between the uniformly spaced openings or projections act as thermal barriers for environmental control. When misalignment of the tubular projections and shielding members occurs the efficiency of the apparatus is greatly decreased and the glass filaments tend to become non-uniform in diameter. Misalignment typically occurs when the bottom surface of a bushing begins to sag. The bushing sag may be temporarily compensated for by adjusting the shielding members, but a poor heat pattern develops thereby adversely affecting the quality of glass fibers being formed. Shortly after sagging of the bushing a point is reached where adjustment of the shielding members can no longer compensate for the sagging bushing. The outside tips become too hot causing the formed fibers to burn off prior to collection, i.e. their weight exceeds their tensile strength at that temperature. The central tips of the bushing, on the other hand, become too cold causing beading of the glass, thereby leading to the shutdown of the bushing because of extremely poor quality fibers and low efficiencies.

Still another problem that exists for the users of fabricated articles comprising precious metals at high temperatures is the reclamation of the precious metals from castable refractory materials which surround the fabricated articles as a support and heat control means. Again, specific reference is made to a bushing as the fabricated article which is completely surrounded, except for its bottom surface, with a castable refractory material.

Prior to this invention any precious metal, such as for example, platinum, that migrated via oxidation and volatilization to the castable refractory materials, employed to support the bushing structure and to minimize heat losses, would migrate or penetrate deeply therein, thereby requiring a lengthy and costly reclamation program. The castable material had to be ground into small pieces, ball milled, mineral jigged, and then exposed to two vibrating table separators (gravity-density differences). Two cycles of this reclamation process were required before the material that remained was sent to a smelter for melting, further separation of the platinum from the refractory, and refinement. From the time the castable refractory had been removed from the bushing structure for reclaiming the platinum, to the time most of the platinum was recovered, approximately six months elapsed. By the above described reclamation process, the platinum that was recovered was available for working or fabricating into a new bushing structure but because of the large time period required for the reclamation period, maintenance of higher platinum inventories were required whereas when laminar refractory structures are prepared according to the inventive concept, the castable refractory material is thrown away after service without it having had to be processed to recover any precious metals therefrom.

When a refractory coating is applied to a bushing, it serves to prevent migration of precious metal oxides and also to help support the bushing while in service at high temperatures. For this reason the castable refractory material can be thrown away and the refractory coating is simply stripped with an acid from the bushing and further dissolved in the acid. The acid used for stripping and dissolving is preferably the same acid used to flush out the glass from the bushing after service. Subsequently, the metals are separated by gravity, ion exchange and filtration, in a relatively short time. Alternatively the refractory material may be stripped from the bushing by blasting with glass beads and then by dissolving in acid for further separation.

Apparatus, other than textile bushings, were also treated by exposing the surfaces to be coated to grit blasting at low pressures with a high purity abrasive, sufficient to obtain good bonding of the refractory material thereto. These included wool bushings and bonded mat bushings used in the production of non-woven structures, comprising base metal alloys as well as precious metal alloys.

Oxidation losses from precious metal articles at high operating temperatures have been known and lived with for quite some time. Attempts have been made to limit these losses such as for example by slurry coating the articles with a material for protection against the elements. However, with these early attempts to protect articles made of precious metals, additional problems developed. One such problem was the difficulty in applying the coatings to the article in a uniform manner, thereby adversely affecting the efficiency of the treated article in service. The stability of these coatings was questionable because invariably, after only a short service time, crack propagation developed in the coatings. These coatings could not be fused to the article, but only deposited thereon, and the density thereof was not sufficient to act as a true barrier to the outward migration of precious metal oxides.

Other attempts at coating precious metal articles in the past include the extreme roughening of the surface to be coated, but these had drawbacks because too much precious metal was lost during the roughening operation, and on reclamation the coating was extremely difficult to remove because of its tenacious adherence to the roughened surface.

Still another attempt at protecting precious metal articles from oxidation attack at high temperatures included the bonding of a sub-coating to the articles prior to the adherence of a refractory coating, but this led to contamination of the platinum during reclamation.

When refractory coatings are applied to fabricated articles comprising precious metals by our method, all of the above problems are greatly reduced. In fact, there is a complete reclamation of the precious metals from the refractory coating that migrated thereto during service, the time of reclamation is substantially shorter, and the process of reclamation is greatly simplified.

SUMMARY OF THE INVENTION

A refractory material comprising $MgO, ZrO_2, Al_2O_3, TiO_2, Cr_2O_3$ or other suitable refractory and combinations thereof and a method for applying the refractory to articles fabricated from precious metals is provided so that a laminar refractory structure is obtained to preclude oxidation losses of the precious metals during service at extremely high operating temperatures, thereby improving the life of the fabricated articles.

Advantages of the instant invention in addition to the prevention of losses of precious metals include: an improvement in the structural stability of the fabricated articles at high temperatures; a low permeability barrier provided by the coating which eliminates the reclamation process of the castable refractory above described, by inhibiting the outward migration of precious metals through oxidation; a coating which has good bonding characteristics but which is easily removed subsequent to operation, thereby allowing the precious metal article itself to be easily reclaimed so that a reduction in fabrication costs results; an improved refractory structure is obtained by maintaining uniformity throughout the structure; higher operating temperatures (approximately 3300° F.) can be employed thereby allowing cheaper glass compositions to be used to form glass fibers; and the thickness of the sidewalls of the bushing can be reduced because of the mechanical support offered by the refractory coating to prevent sag.

Ancillary advantages that arise by using and applying coatings according to the instant invention, but not to be overlooked, include an effective reduction in the precious metal inventories, an increase in available fabricated articles assuming a constant inventory, and a great economic savings without impairing but in fact improving, performance of the fabricated articles.

It has also been observed that more uniform glass fibers are obtained over a longer period of time because the composite bushing of this invention resists sagging, so that the holes or tubular projections of the bushing do not become misaligned with heat shielding members. This is extremely critical. Misalignment causes non-uniform cooling of the molten streams of glass thereby varyingly affecting the diameter of the formed filaments during attenuation.

Because oxidation losses of precious metals have long been a problem with fabricated articles used at high service temperatures, theories have been propounded as to how these oxidation losses occur and how they may be reduced. Fryburg presented the "Boundary Layer Diffusion" theory of platinum oxidation in 1965.[1] This theory has gained wide acceptance, particularly in the temperature range of 1800° F.–3300° F. The theory is equally applicable to platinum, rhodium, or their binary alloys. The mechanism of formation of the oxides is the same for all alloys. Fryburg stated that the precious metal surface is surrounded by a finite volume, termed a boundary layer, which can be viewed as a layer of static atmosphere. When a precious metal oxide forms on the alloy surface, it immediately volatizes and diffuses to the outer edge of the boundary layer to be carried away by moving atmosphere. However, it is thought that within the boundary layer, escaping oxide molecules collide with other molecules and in many instances are back-directed to the alloy surface.

The rate of oxide loss is governed by this phenomenon. Therefore, any action taken to saturate or densify the boundary layer (e.g., provide more collision sites) will help to reduce the net diffusion through this layer thereby decreasing oxidation losses. Through the application of a refractory coating onto the alloy surface, this saturation is provided with an effectiveness proportional to the coating density and thickness.

When the fabricated article is a bushing or feeder, comprising a body, tip section and rows of tips for use in the production of glass fibers, another benefit arises when refractory coatings are applied to the tip section of a bushing, which is exposed to rapid atmospheric flow. It is known that an increase in system flow-by will decrease the thickness of the boundary layer thereby decreasing the number of available collision sites. It follows then that oxidation losses will increase because the distance each molecule must travel through the boundary layer becomes shorter and the probability of collision lower, unless a stable high density coating is provided to increase the density of collision sites within the boundary layer.

When refractory coatings are applied to the alloy surface via high temperature spraying, there is thought to be provided a static layer independent of system flow. The resulting composition inhibits oxidation losses, probably because of the high density of the coating, and actually aids in the reduction of sag while in service, i.e., the composite is stronger. Our refractory coatings are fused onto the alloy surface at a temperature greatly in excess of the temperature at which the laminate will be exposed.

The stability of refractory materials has however, been a problem in the past. Former attempts at coating an alloy surface with a refractory material led to the cracking of the coating during operation at high temperatures,

---

[1] Fryburg, "The Pressure Dependency in the Oxidation of Platinum by a Boundary-Layer Diffusion Mechanism," Transactions of AIME, vol. 233, November 1965.

thereby reducing its effectiveness as a barrier and permitting an exit for volatile oxides. By using standard flame spray or plasma spray equipment and selecting a refractory coating which has a coefficient of expansion from $0.5$–$4.0 \times 10^{-6}$ inches/inch °C. lower than the alloy to be coated, not only does the stability of the coating improve, but the composite structure is stronger.

In view of the foregoing it is an object of the present invention to provide a more efficient, more economically operable apparatus for fiber forming operations wherein fibers are attenuated from thermoplastic materials supplied from orificed feeders or bushings.

It is another object to provide an improved means for the production of continuous glass fibers wherein a high density coating is removably attached to orificed feeders or bushings.

It is a still further object to provide an improved means for the production of continuous glass fibers wherein the high density coating serves to prevent oxidation losses of precious metal oxides during the service of the feeders or bushings and is easily removable in subsequent operations so that precious metals that have migrated thereto may be reclaimed.

Additionally, it is an object of the present invention to provide a glass fiber forming apparatus adapted to withstand the tendency to sag or buckle while exposed to high temperatures in service.

In carrying out the above objects there is illustrated herein apparatus for producing a plurality of filaments of heat softenable material comprising: a feeder for feeding such material in molten form to orifices from which streams of the material flow; a high density refractory coating for retaining volatile precious metal oxides therein; material for insulation and expansion of the bushing during service; and an outer refractory casing.

The coating for retaining volatile oxides may be composed of any material capable of withstanding extremely high temperatures and which is easily removable from the feeder so that reclamation of the metals from their oxides may be accomplished.

Also illustrated herein is apparatus for producing a plurality of filaments of heat softenable material wherein the apparatus has not been treated in accordance with the inventive concepts, so that a better understanding of the problems involved may be realized.

Other objects, advantages and features will become apparent when the following description is taken in conjunction with the accompanying drawings, in which.

Figures 1, 2, 3:
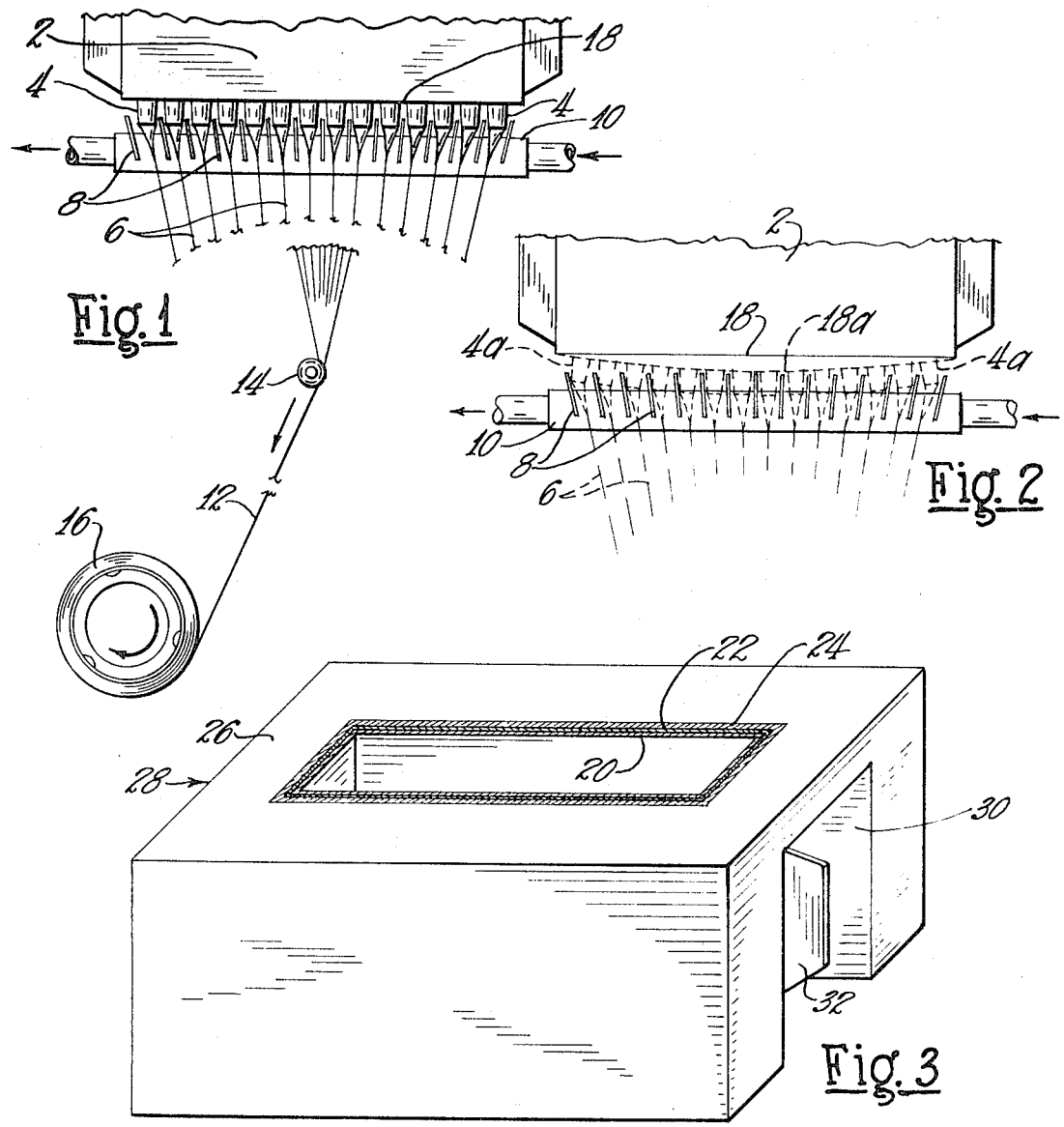
FIG. 1 is an elevational view of a feeder or bushing in an aligned relationship to a fin shield assembly.
FIG. 2 is an elevational view of a feeder in a misaligned relationship to a fin shield assembly.
FIG. 3 is a perspective view looking down on a bushing assembly prepared in accordance with the principles of the present invention.

Referring now the drawings, FIG. 1 shows a fabricated bushing in its original position wherein perfect alignment between the tubular projections and the shielding members prevails.

The bushing structure 2 has tips or tubular projections 4 extending from the bottom surface 18 of the bushing structure which are aligned in such a manner that filaments of molten glass 6 pass equidistant between fin shields 8 uniformly mounted on a header or manifold 10 through which a coolant is passed. The filaments are sized with a protective material, gathered into a strand 12 via a gathering device such as a grooved roller 14 and subsequently wound onto a package.

Because of the high temperatures required in the formation of glass filaments and the tremendous strain put upon the bottom surface 18 of the bushing structure 2 during the formation of glass filament, as illustrated in FIG. 2, sagging of the bottom surface 18a occurs leading to the misalignment of the tubular projections 4a with the fin shields 8 which in turn causes breakouts of the forming filaments 6 and the eventual shut-down of the bushing structure. However, before the shut-down of the bushing structure, there is a period when non-uniform diameter filaments are produced, leading to quality-control problems. When the bushing structure is treated according to the inventive concepts however, as depicted in FIGS. 3 and 4 the problems of sagging, misalignment and non-uniformity are substantially eliminated.

Referring to FIG. 3 bushing 20 has a refractory coating 22 on its exterior surfaces including the bottom surface or tip plate which supports tubular projections from which molten streams of glass emit in the form of filaments. Disposed about the coating on the bushing, and in a touching relationship, except for the bottom surface of the bushing is a high temperature fibrous material 24 used to insulate and allow for expansion of the bushing during service, and which material facilitates removal of a disposable castable refractory material 26 after the bushing has completed its use in service.

During service at high temperatures the laminar refractory structure 28 shows a remarkable increase in its resistance to sagging in addition to other properties heretofore discussed. A relief 30 in the castable refractory material 26 is provided so that a terminal 32 connected to the bushing, has sufficient room to receive an electrical connection in order to supply and maintain heat to the bushing for melting the glass therein.

Figure 4:
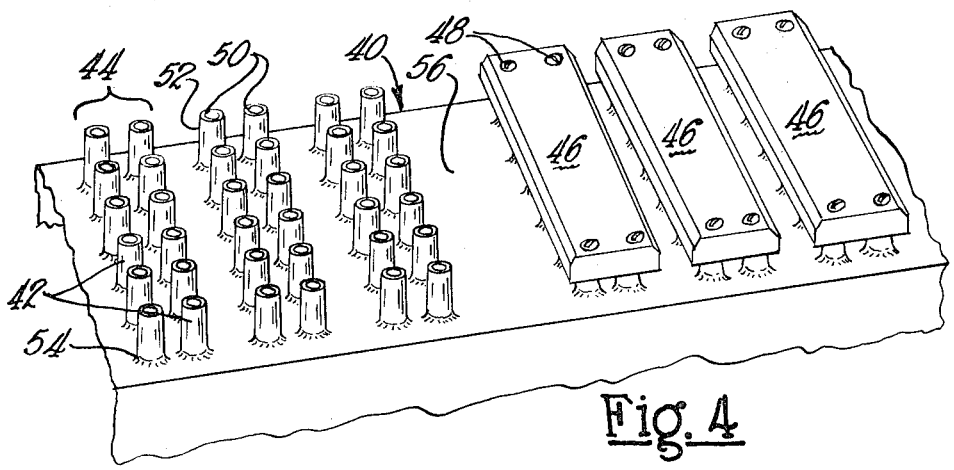
FIG. 4 is a perspective view looking down on a bushing partially prepared for treatment with a refractory.

Referring to FIG. 4, the bushing 40 shows tubular projections 42 arranged in spaced apart double rows 44 wherein some of the double rows are covered with removably fixed stainless steel covers 46 secured by long pins 48 that extend through the covers and the tubular projections. The covers are designed to protect the machined edges of the projections 50 and the sidewalls 52 of the tubular projections, thereby leaving uncovered, the slant or base portion 54 of the tubular projections which are welded to the bottom surface 56 of the bushing. Substantially the entire bottom surface is uncovered and in readiness to receive a refractory coating. Attention is directed to the fact that the area of the bottom masked out by the cover is negligible, so that when a refractory coating is subsequently applied, substantially all of the bottom surface is coated with the refractory.

Figure 5:
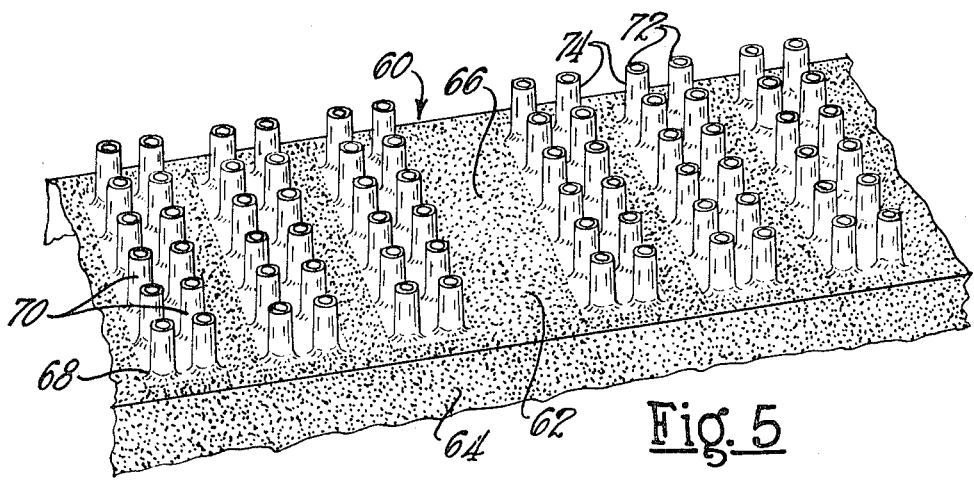
FIG. 5 is a perspective view looking down on a bushing having a refractory coating on the tip plate and the sidewalls.

Referring to FIG. 5, the bushing 60 is shown with a refractory coating 62 which covers the bushing sidewall 64 and substantially the entire bottom surface 66 of the bushing. The refractory coating covers part of the base portion 68 of the hollow projections 70. The edges 72 and the sidewalls 74 of the projections are shown without the refractory and still possess a machined finish.

The inside of the bushing may also be coated with a refractory material which is resistant to glass attack to further strengthen the structure and to prevent oxidation losses of precious metals from the bushing into the molten glass, thereby increasing bushing life.

The term "bushing life" refers to the life of a bushing during service at high operating temperatures. Normal imperfections during fabrication, such as non-uniform cross-section in a precious metal sheet, produce localized heat or thermal concentrations due to high current in the areas of lesser cross-section. The bushing itself is looked at and is considered as an electrical heating element. Oxidation and volatilization losses will occur more readily in these areas of high current density. These cross-sectional areas are further thinned by volatilization losses, thereby further increasing current density. This condition accelerates until an actual burn-through or melting of the metal occurs, causing failure of the bushing. This is especially critical in weld-zones, where two or more sheets of metal are joined in the fabrication of a bushing, because the metal is thinned by welding. Our coatings and methods of applying the coatings retards further degradation of the bushing through volatilization losses thereby extending bushing life, without adversely affecting other desirable properties.

Selection of a refractory coating having a coefficient of thermal expansion less than the coefficient of thermal expansion of the fabricated article to be coated, plays an important role in strengthening the bushing. It is surmised that by applying such a coating to the article, for example, to the tip-section and/or the sidewalls of a bushing, the coating imparts a slight arch, inwardly, thereby serving to strengthen the structure. The arch, no matter how slight, serves as any other arch, that is, compressive forces are exerted on the tip section to help prevent sagging thereof during operation. In some operations it is feasible to reduce the thickness of the alloy structures because of the increased strength provided by the coating.

Depending upon the operating temperatures (1800–3300° F.) during service, the composition of the coating may be altered to provide greater or lesser differences in the coefficients of expansion between the coating and the article to be coated. Also the thickness of the coating is a function of temperature and the intended application of the treated article.

When a precious metal bushing is roughened in preparation for receiving a refractory coating, such as by grit blasting, it has been observed that the hole diameters of the tips of the bushing are subject to alteration. In order to combat this alteration, the tip edge, the tip sidewall and optionally the tip slant or base that meets the tip plate must be protected during grit blasting.

Another reason for the need to protect tip edges, sidewalls and slants is that when a bushing is fabricated from a precious metal alloy, a predetermined contact angle is established therein. "Contact angle" is defined as 2 $\tan^{-1} h/x$, wherein $h$ is the height of the molten bubble of glass on a particular substrate and $x$ is the radius of the base of the bubble. When a constructed tip on the tip plate is altered such as by roughening the surface via grit blasting or by covering the same with a refractory having a lower contact angle, the predetermined contact angle is adversely affected, and a phenomenon known as flooding occurs. "Flooding" is defined as the covering or wetting of a substrate, such as the tip plate of a bushing with molten glass which disrupts the formation of glass fibers. As the contact angle decreases, i.e. approaches zero degrees, the tendency toward flooding increases, which inhibits the formation of glass fibers. Surface conditions, temperature, the particular alloy and specific glass compositions are among the factors to be considered when establishing the contact angle. Generally, when the surface of a particular substrate is rough, its resistance to flooding or wetting is low. Also, when a rough, as compared to a smooth, surface floods, it is more difficult to clean, therefore a relatively smooth surface is desired.

Even though the tips of a bushing extend downwardly from the tip plate, contact angle is critical, because capillary attraction may exist to bring on a state of flooding. Knowing the relative attraction of the molecules of the liquid, molten glass, for each other and for those of the solid, flooding can be theoretically prevented upon fabrication, but if the surface conditions are disturbed, such as by roughening, the contact angle will be lessened, thereby initiating flooding.

An effective method of protecting the tips of a bushing during grit blasting and application of a refractory coating to the tip plate of the bushing comprises covering the tips with a plurality of hard metal alloy covers or jackets which are removably fixed to the tips, so that after application of the refractory coating, the covers may be removed and used over again. A preferred hard metal alloy for use as a cover is stainless steel. A high temperature fibrous mass or mat of a thickness of from $\frac{1}{16}$ inch to about $\frac{1}{4}$ inch should line the inside of the covers for the following reasons: (1) to prevent contamination of the precious metal by the steel covers, which would affect the contact angle of molten glass emitting from the tips; (2) to act as a cushion for the tips during grit blashing and application of the refractory; and (3) to prevent grit and other foreign matter from entering the tips and/or clogging the orifices of the tips. With this method of protecting the tips, there is a substantially complete coverage of the tip plate of the bushing.

It is theorized that a synergistic effect occurs when a refractory coating, which is brittle is bonded to a precious metal alloy which is ductile, to produce a laminate possessing properties not possessed singularly by the refractory nor the alloy, and therefore complete coverage of the tip plate is not necessary in order to increase the strength thereof.

It is further thought that when there is susbtantially complete coverage of the tip plate and the coefficient of expansion of the refractory coating is lower than that of the alloy, a compressive force exists that acts to support the alloy. This phenomenon may also exist when there is not a complete coverage of the alloy surface.

It is preferred however, to obtain as complete a coverage of the exposed surfaces of an article, not only to prevent volatilization losses of precious metal oxides, but also to obtain the maximum compressive force thereon, to add strength thereto.

Upon thermal spraying of an article roughened by grit blasting, such as a precious metal bushing, the refractory particles that emit from the spray gun, are heated on their way to the article, and travel at very high velocities so that on impact with the article, there is plastic deformation of the particles around the roughened surface. Friction bonding or mechanical bonding occurs wherein the particles become oblong and non-uniform in character, and the result is a film rougher than the roughened surface of the article. The film, through the action of heat and velocity, is of high density, whereas with slurry or brush coating, the refractory is much less dense and is not bonded to the roughened alloy surface. Thermal spraying is accomplished by conventional plasma spray or flame spray techniques.

Having described the basic concepts of this invention and the theoretical considerations believed to be involved, illustration will now be made of the practice of this invention.

EXAMPLE

A glass fiber forming apparatus, called a bushing, fabricated from precious metals, was transformed into a laminar refractory structure. A bushing comprises four sidewalls and a bottom section called a tip plate. The tip plate has a plurality of rows of tips or hollow members extending downwardly from which molten glass emits for attenuation in glass fibers. The tips extend perpendicularly and downwardly from the tip plate, but have a slanted portion or base where they meet the plate. During fabrication of the bushing a pre-determined contact angle is established for the tips. When the contact angle is altered by some outside means, a condition known as flooding occurs wherein molten glass from one tip merges with molten glass from other tips, thereby disrupting the formation of fibers. During the transformation of the fabricated bushing into a laminar refractory structure, the tips must be protected so that the contact angle is not disturbed. The following procedure has proven successful in the protection of the tips. Stainless steel covers are removably fixed over the plurality of rows of tips on the tip plate, so that the tip edges and tip sidewalls are protected during a subsequent roughening operation, wherein the bushing is subjected to grit blasting with pure alumina (50–100 grit) at a pressure of about 30–40 p.s.i., until the surface of the alloy changes from bright-shiny to dullgray, to obtain the desired degree of roughness to receive and hold a refractory coating. The roughened surfaces of the bushing are covered with a thin coating of magnesium zirconate with a Metco thermospray gun. The magnesium zirconate, originally in powdered form, undergoes plastic deformation to form a high density film by the action of heat and high velocity, so that upon contact with the roughened surface, mechanical or friction bonding holds the film to the bushing.

The coated bushing when treated by the above described procedure was then placed into position to receive molten glass for the formation of glass fibers at service temperatures of approximately 2950° F. and was surrounded by a disposable, castable refractory material. The coated apparatus remained in service approximately 50 percent longer under the same operating conditions as an apparatus without a refractory coating (control). After removal of the laminar structure from the fiber forming operation, the disposable refractory material was discarded without reclamation and the refractory coating was stripped from the laminar structure and dissolved in about a 70 percent hydrofluoric acid solution in 40–48 hours. Subsequently, weight losses of the coated structure were measured against those of the control to compare the amount of oxidation of the precious metals of each. The weight loss of precious metal from the coated apparatus during operation periods decreased more than 50 percent. The refractory coating showed good bond quality, excellent durability under high temperature service conditions and good thermal stability. The refractory coating, after having been stripped from the laminar structure, was easy to grind prior to being treated with acid and any platinum that had migrated thereto via oxidation was separated and recovered. Alloy losses due to grit blasting were held to approximately 0.01 percent of total weight and were directly recoverable. This was ten times less than the daily operating losses of an apparatus without a refractory coating (control).

Because of the improved life of the bushing, glass fibers of uniform quality were attenuated over longer periods of time because the structure remained more dimensionally stable, thereby requiring less adjustments during the formation of fibers.

We claim:

1. A glass fiber forming apparatus adapted to hold and emit molten glass for attenuation into glass fibers, said apparatus comprising being fabricated from a platinum group alloy comprising:
   (a) sidewalls and a bottom wall, and
   (b) a plurality of rows of tubular projections extending downwardly from the bottom wall, said apparatus comprising having a coating of a refractory material not of the platinum group, removably bonded to the apparatus to form a composite, wherein said coating is of sufficient density and thickness to preclude the migration of volatile oxides of the platinum metal group from the apparatus during service of the apparatus at temperatures of molten glass, wherein said coating is capable of retaining the oxides of the platinum group therein so that the platinum group metal can be reclaimed subsequent to the service of the apparatus, and wherein said coating is resistant to deterioration at temperatures of molten glass, and said apparatus further comprising having the outer surface of the tubular projections adjacent the orifices, free from said refractory material, so that molten glass, emitting from the orifices of the tubular projections, does not normally contact the refractory coating, and wherein the refractory material has a coefficient of thermal expansion substantially lower than the coefficient of expansion of the alloy in order to impart compressive forces to the sidewalls and the bottom wall to help support and maintain the apparatus in a dimensionally stable condition during operation at temperatures of molten glass, and to help maintain the alignment of the tubular projections during operation of the apparatus at temperatures of molten glass so that uniformity of glass fiber diameter is maintained.

2. The glass fiber forming apparatus as claimed in claim 1 wherein the sidewalls and bottom wall have roughened surfaces sufficient to physically hold the refractory material during service of the bushing at high temperatures but insufficient to conventionally remove the refractory material after service.

3. The glass fiber forming apparatus as claimed in claim 1 wherein the coating of refractory material is magnesium zirconate and wherein the coating is of sufficient thickness to preclude the migration of oxides of the platinum metal group therefrom, during the service of the apparatus at high operating temperatures, and to retain the oxides of the platinum group therein so that the platinum group metal can be reclaimed subsequent to the service of the apparatus.

4. The glass fiber forming apparatus as claimed in claim 3, wherein the magnesium zirconate has a thickness of from 0.002 to about 0.030 inch.

5. The glass fiber forming apparatus as claimed in claim 1, wherein the coefficient of thermal expansion of the refractory material is from $0.5–4.0 \times 10^{-6}$ inches/inch ° C. lower than the coefficient of thermal expansion of the alloy.

References Cited
UNITED STATES PATENTS

| | | | |
|---|---|---|---|
| 3,431,141 | 3/1969 | Eorgan | 117—135.1 |
| 3,470,017 | 9/1969 | Rubin et al. | 117—105.2 |
| 3,503,792 | 3/1970 | Bagniski et al. | 117—135.1 |
| 2,777,254 | 1/1957 | Siefert et al. | 65—374 X |
| 2,947,114 | 8/1960 | Hill | 65—374 UX |
| 3,294,503 | 12/1966 | Machlan et al. | 65—1 |

ROBERT LINDSAY, JR., Primary Examiner

U.S. Cl. X.R.
65—374; 117—135.1